(12) United States Patent
Andreoli

(10) Patent No.: US 7,784,753 B2
(45) Date of Patent: Aug. 31, 2010

(54) BASE FOR SUPPORT FOOT WITH HIGH STRENGTH FOR SUPPORTING HEAVY BODIES

(75) Inventor: Andrea Andreoli, Modena (IT)

(73) Assignee: Rexnord Marbett S.r.l., Correggio (Reggio Emilia) (IT)

( * ) Notice: Subject to any disclaimer, the term of this patent is extended or adjusted under 35 U.S.C. 154(b) by 499 days.

(21) Appl. No.: 11/682,388

(22) Filed: Mar. 6, 2007

(65) Prior Publication Data
US 2007/0205343 A1 Sep. 6, 2007

(30) Foreign Application Priority Data
Mar. 6, 2006 (IT) .................. MI2006A000393

(51) Int. Cl.
*A47B 91/00* (2006.01)
(52) U.S. Cl. ............................... 248/188.9; 248/188.8
(58) Field of Classification Search .............. 248/188.8, 248/188.9, 677, 188.2, 188.4, 346.11; 16/32, 16/30
See application file for complete search history.

(56) References Cited

U.S. PATENT DOCUMENTS

| RE18,647 E | * | 11/1932 | Phillips | .................... 248/188.2 |
| 3,601,345 A | * | 8/1971 | Johnson | ........................ 248/615 |
| 4,121,393 A | * | 10/1978 | Renault et al. | ............. 52/167.7 |
| 5,794,912 A | * | 8/1998 | Whittaker et al. | ............ 248/638 |
| 6,938,872 B2 | * | 9/2005 | Nygaard | ....................... 248/677 |
| 2001/0019096 A1 | * | 9/2001 | Andreoli et al. | ........... 248/188.8 |
| 2002/0008187 A1 | * | 1/2002 | Ganter | ........................ 248/677 |
| 2003/0031812 A1 | * | 2/2003 | Bertoncini et al. | .......... 428/34.9 |
| 2004/0135057 A1 | * | 7/2004 | Nygaard | ....................... 248/677 |
| 2004/0262467 A1 | * | 12/2004 | Burr | ........................ 248/188.4 |
| 2006/0289709 A1 | * | 12/2006 | Yonezawa et al. | ......... 248/188.8 |

* cited by examiner

*Primary Examiner*—A. Joseph Wujciak, III
(74) *Attorney, Agent, or Firm*—Quarles & Brady LLP

(57) ABSTRACT

A base (110) for a support foot (100) for supporting heavy bodies on a support surface, comprising a cap (115) intended in the use to be mechanically coupled to coupling means (105) of the base to a body to be supported. The cap is made of a first material of mechanical properties such as to guarantee that the cap is able to support, remaining substantially within the limit of elastic deformability, a first significative fraction of a load received by said coupling means to the body to be supported, and has said concavity on the side that, in the use, faces the support surface. A synthetic material mass (210) is arranged in adhesion to the cap and it is adapted to substantially fill the concavity of the cap, forming a contact surface (215) with a support surface. A support frame (240), buried within the synthetic material mass, is made of a second material having mechanical properties comparable to that of the cap, such as to guarantee that the support frame can support, remaining substantially within the limit of the elastic deformability, a second significative fraction of said load, wherein the first and second fractions of the load form altogether substantially the total load.

12 Claims, 2 Drawing Sheets

BASE FOR SUPPORT FOOT WITH HIGH STRENGTH FOR SUPPORTING HEAVY BODIES

The present invention relates to a base for a support foot with high strength, of the type used for supporting very heavy bodies, on the ground or generally on a support surface, particularly working machines for industrial plants of various kinds, for example, but not limitatively, of the type used in the production and food packaging industry.

Known support feet of the above-mentioned type are generally constituted by a stem, coupled, at one end thereof, to a base, intended to rest on a support surface, for example the ground, or the floor of an industrial shed, and, at the other end, to the heavy body that has to be supported. The coupling of the stem to the body to be supported is usually accomplished by screwing so as to allow the height regulation of the foot. The coupling between the stem and the base may be of the stiff type, and in such case the support feet are referred to as fixed, or such as to allow the relative orientation between the stem and the base so as to adapt to non-flat support surfaces; in such case, the support feet are referred to as articulated.

One of the main parameters which distinguish the support feet for heavy bodies is the maximum tolerable load, intended to be the value of the load applied to the stem of the foot corresponding to the limit of elastic deformability of the foot itself (trespassed such limit, the base risks to deform in a plastic way, irreversibly, and even to break, with all the negative consequences that this implies if it occurs in the use). On the market, support feet with plastic or steel stems are available, of various diameter, depending on the maximum tolerable load. The bases may be of plastic or steel as well, also depending on the maximum desired load. The support feet with steel stem and base are able to support maximum loads generally heavier than those, which are tolerable by the feet with plastic stem and base and the feet with steel stem and plastic base.

Among the support feet with steel base which are available on the market, there are some wherein the base is constituted by a generically spherical steel cap, of various diameter particularly stainless steel (for better withstanding the aggressive agents which may be found in a several environments wherein the support feet are employed); the cap is obtained by moulding with drawing die of a sheet of steel of a suitable thickness, and it has overmoulded on the concave side thereof (facing the support surface, in the use), synthetic material, for example rubber; a hole in the top of the cap allows the insertion of a screw for the stiff (non-articulated) coupling to the stem.

The Applicant has observed that such support feet, although satisfactory, nevertheless can withstand loads which are limited substantially by the thickness of the steel sheet from which the cap is obtained: in order to be able to support heavier loads, it should be particular necessary to increase the steel thickness, but this is not practical beyond a certain extent, since it would not be possible anymore to obtain the cap by moulding, drawing and cutting, and more expensive manufacturing techniques would be necessary.

In view of the described state of the art, the Applicant has tackled the problem of improving the straight features of the known support feet.

According to an aspect of the present invention, a base for a support foot for supporting heavy bodies on a support surface is claimed, comprising: a cap being made of a first material, a synthetic material mass and a contact surface said cap having a concavity on the side that faces the contact surface, the synthetic material mass arranged in adhesion to the cap and adapted to substantially fill the concavity of the cap, having a reinforcement frame made of a second material, integrated within said synthetic material mass.

Preferably the base is further comprising coupling means said coupling means are able to mechanically couple the cap to a body that is to be supported.

More preferably the base is further comprising a first material having mechanical properties such as to guarantee that the cap is able to support a first significant fraction of a load received by the coupling means from the body to be supported, the second material having mechanical properties comparable to those of the cap, such as to guarantee that the support frame can support a second significant fraction of said load, said first and second fractions of load forming altogether the substantial totality of the load.

In other words the base has a cap intended in the use to be mechanically coupled to coupling means of the base with a body to be supported, wherein said cap is made of a first material of mechanical properties such as to guarantee that it is able to support a first substantial portion of a load received by said coupling means to the body to be supported; by "being able to support" a certain load, there is meant able to support such load substantially remaining within the limit of the elastic deformability, and thus without any substantial plastic deformation, permanent, and, in particular, without breaking.

The cap has a concavity on the side that, in the use, faces the support surface, and a synthetic material mass is arranged in adherence to the cap and adapted to substantially fill the concavity of the cap.

A reinforcement frame is further provided, buried within said synthetic material mass, said support frame being of a second material having mechanical properties comparable to the those of the cap, such as to guarantee that the support frame can support a second substantial portion of said load, which, together with the first portion, constitutes essentially the totality of the load which the base is intended to support in the use.

According to a second aspect of the invention, a support foot for heavy bodies is provided comprising a base in accordance with the first aspect of the invention.

According to a third aspect of the invention, a manufacturing method of a base for a support foot for heavy bodies is provided.

The features and the advantages of the present invention, will be best understood by the following detailed description of practical embodiment thereof, given purely by way of an exemplary and non-restrictive indication which will be made in conjunction with the accompanying drawings, wherein.

Figure 1:
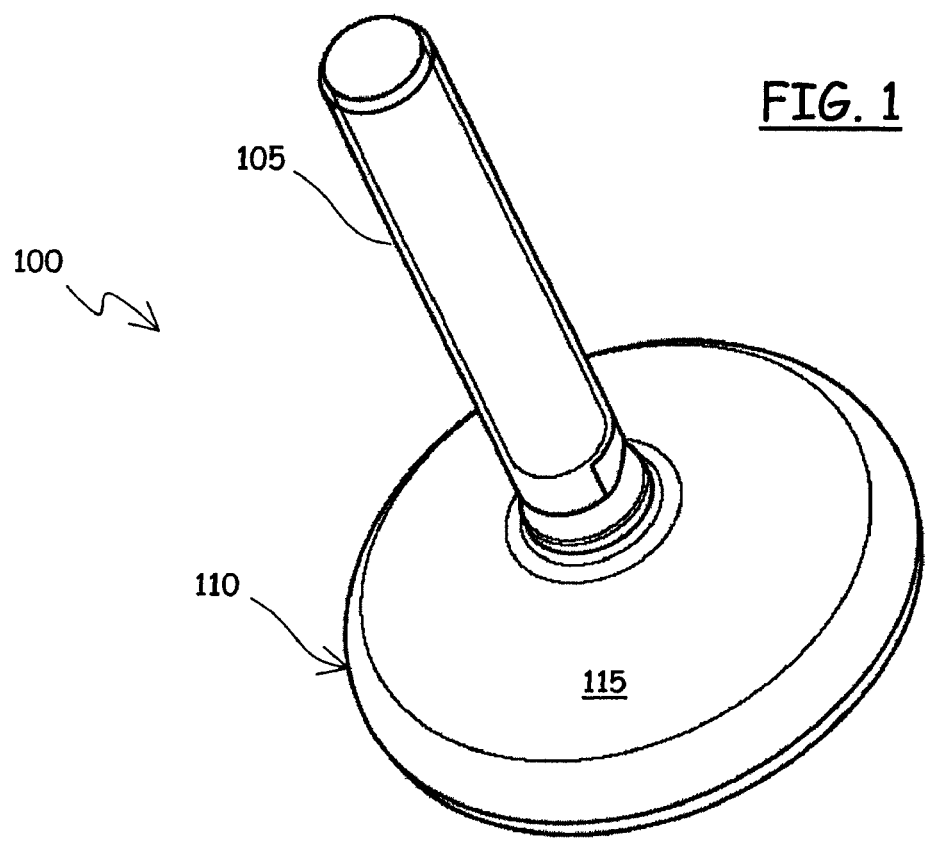
FIG. 1 is an axonometric view of a support foot according to an embodiment of the present invention.
Figure 2:
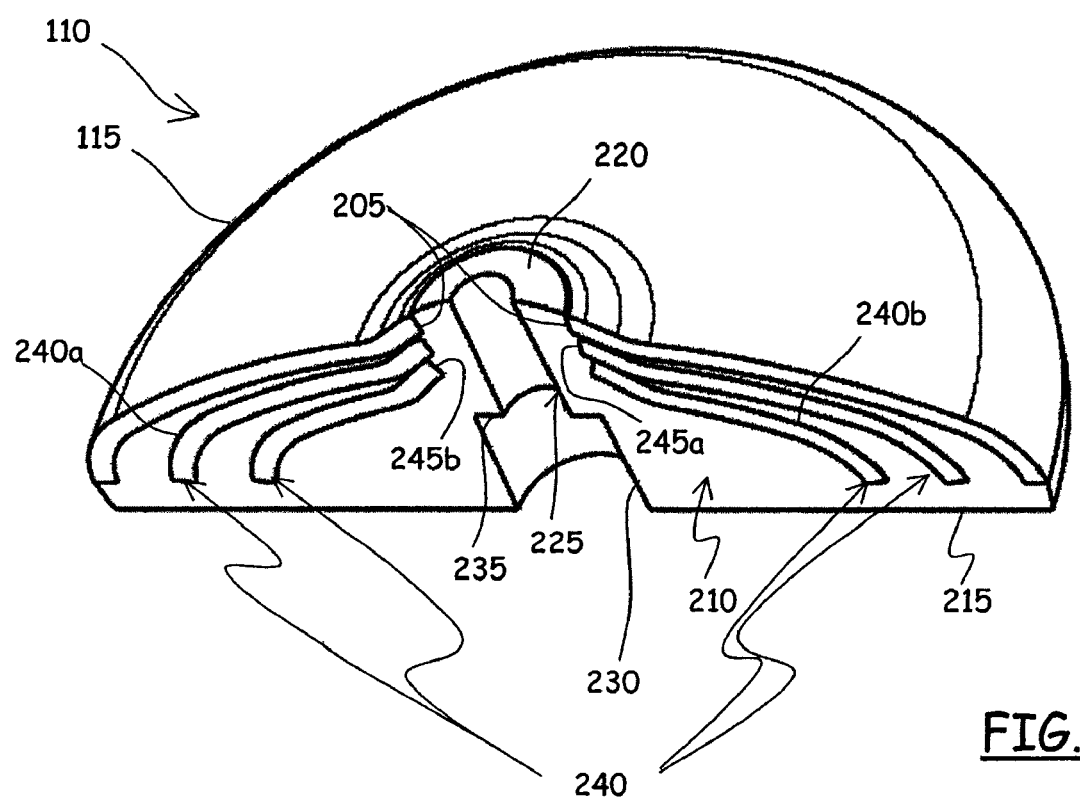
FIG. 2 is an axonometric view in diametral section of a base of the support foot of FIG. 1, according to an embodiment of the present invention.
Figure 3:
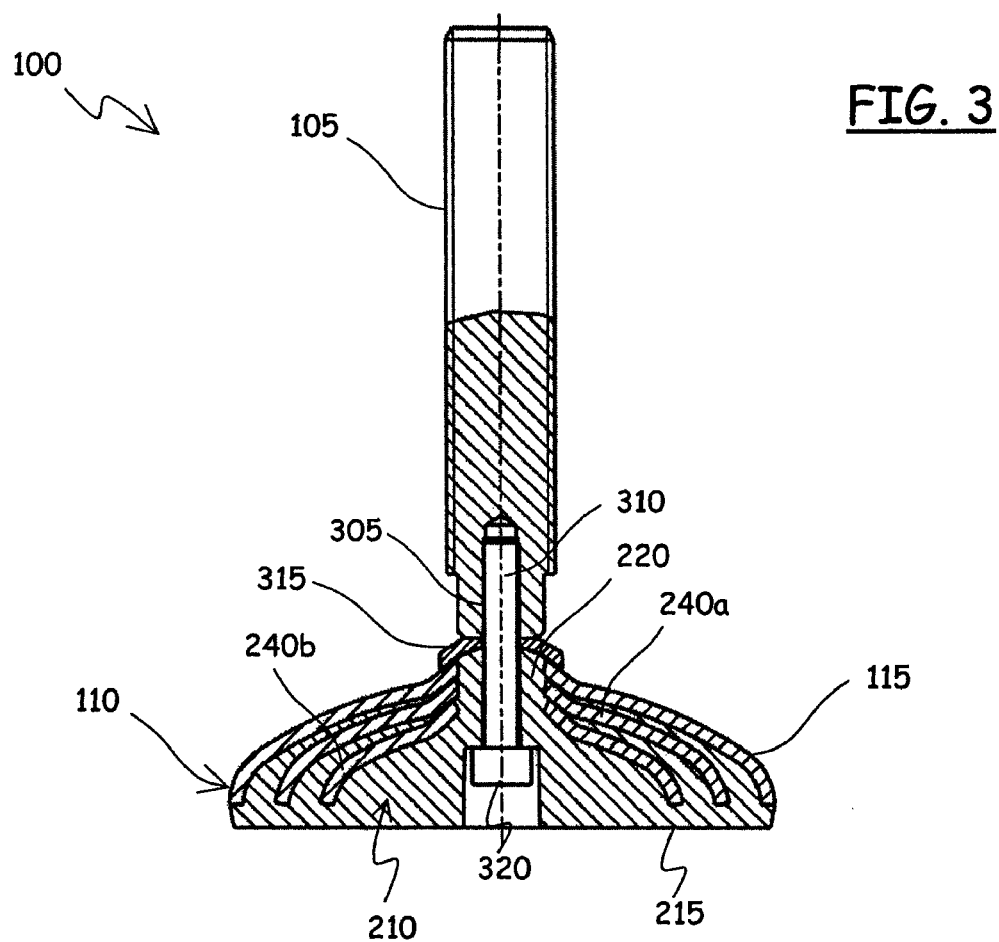
FIG. 3 is a cross-sectional view of the support foot of FIG. 1 according to a diametral plane of the base, according to an embodiment of the present invention.

Referring to the drawings, and particularly to FIGS. 1 to 3, a support foot for heavy bodies according to an embodiment of the present invention, globally denoted with 100, comprises a stem 105 and a base 110.

The stem 105, in the example herein considered, comprises a generally cylindrical steel stem, preferably but not limitatively of stainless steel, or galvanized steel and, on one end thereof intended for the coupling to the base 110, it is provided with a threaded hole 305 (as visible in FIG. 3). On another, opposite end (not shown in the drawings), intended for the coupling to the body to be supported, the stem 205 may for example be provided with an outer thread, for the coupling by screwing to the body to be supported, so as to allow the height regulation of the foot 100.

The base 110 comprises an outer supporting cap 115, that is intended to withstand a substantial portion (merely by way of example, approximately the 50% or more) of the total load offered to the base 110 by the body to be supported and transmitted by the stem 105. In particular, the outer cap 115 has a shape of a generically spherical cap (but other shapes are nevertheless possible, the present invention not being limited to the specific shape of the outer cap 115), and it is made of a material having mechanic characteristics, in particular stiffness, such as to guarantee that the outer cap 115 can support, remaining substantially within the limit of elastic deformability, and thus without plastically deforming o even breaking, said significant portion of the total load. Preferably, the outer cap is made of steel, more preferably stainless steel or nickel-plated steel, for better resisting to the aggression of agents which can be present in the environments where the support foot 100 is intended to be employed. Particularly, the outer cap 115 is for example obtained starting from a generically plane steel sheet of a suitable thickness, for example 3 mm, by moulding with drawing and cutting mould. Substantially on its end, in the outer cap 115 a hole 205 is formed, useful for the coupling to the stem 105, as it is better described in the following.

On the side of the concavity, which in the use faces the support surface, a mass 210 of a suitable synthetic material is overmoulded onto the outer cap 115, for example nitrilic—NBR—or polyurethanic rubber, having suitable stiffness properties, for resisting without excessively expanding to the loads that the support foot is intended to support (for example, a stiffness of approximately 70-100 ShA). The mass 210 substantially fills the concavity of the outer cap 115. An exposed surface 215 of the mass 210 forms an anti-slip contact surface of the foot 100 on the support surface.

The mass 210 protrudes partially from the top hole 205 of the outer cap 115, and forms a spigot 220 projecting from the side of the convexity of the outer cap 115. A through hole 225 is provided, centrally, in the mass 210, having a widened portion 230 toward the surface 215 of the mass 210, which forms a shoulder 235.

According to an embodiment of the present invention, the base 110 further includes a core, a reinforcement frame 240, immersed, buried within the synthetic material mass 210; the reinforcement support core is made of a material having mechanical properties comparable to these of the material of which the outer cap 115 is formed, so that the reinforcement core can guarantee to support, remaining substantially within the limit of elastic deformability, and thus, in particular, without plastically deforming or breaking, a second significant portion (for example, approximately the remaining 50%) of the overall load, which, together with the first portion, forms substantially the totality of the load, which in the use, the support foot is intended to support. In particular, the reinforcement core is made of a material with stiffness comparable to that of the material of which the outer cap is made, of hardness greater than that of the synthetic material constituting the mass 210. In particular, in an embodiment of the present invention, the reinforcement frame 240 comprises at least one, two in the example herein considered, and, more generally, a plurality of inner caps 240a and 240b, for example generically spherical, coaxial and with a diameter progressively reduced compared to the diameter of the outer cap 115. For example, in the case the outer cap 115 has a diameter of 120 mm, the first inner cap 240a can have a diameter of approximately 100 mm, and the second inner cap 240b can have diameter of approximately 80 mm.

For example, the support frame 220, and thus, in the example herein considered, the caps 240a and 240b, are made of steel. Being the caps 240a and 240b inner, immersed into the synthetic material mass 210, they have no exposed surfaces, and thus they are not subjected, in the use, to the attack the agents present in the using room of the foot, nor have they to satisfy particular aesthetic requirements, differently from the outer cap 115. Thanks to this, the inner caps 240a and 240b can be made of a material, which, although resistant, is less noble than that used for making the outer cap 115. For example, in the case the caps 240a and 240b are made of steel, it is possible use simple carbon steel, not necessarily stainless; in other words, since the choice of the material to be used for the frame 240 is not bound by considerations about the resistance to the aggressive agents present in the environment or by aesthetical properties, it is possible to use a material which, from the viewpoint of the strength, even though less noble, is more performant than that which is used for the outer cap 115.

Advantageously, in case of a production of a whole range of support feet and respective bases similar but of various sizes, for example of diameters of 120 mm, 100 mm, 80 mm, etc., the caps 240a and 240b used for making the support frame 240 of the base 110 can be caps intended for being used as outer caps 115 for bases of smaller size.

For assembling the stem 105 to the base 110, as visible in FIG. 3, a screw 310 can be used, which is inserted into the hole 225 from the bottom of the base 110. The end of the stem 105 provided with the threaded hole 305 is put onto the spigot 220 of the synthetic material 210 by interposing a slightly convex washer 315. The screw 310 is screwed into the hole 305 of the stem; by tightening the screw 310, its head abuts the shoulder 235. In such a way, the support foot 100 is ready for being mounted to the body, which it is intended to support. By the washer 315, acting as a meniscus, the total load that in the use is transmitted by the stem 105 is transmitted on the outer load-support cap. From here, the load is transmitted to the synthetic material mass 210, which partially transmits it directly to the ground or the support surface, and partially transmits it to the caps 240a and 240b, which form the reinforcement frame; particularly, the fraction of the load that is not directly transmitted to the ground is transmitted to the inner cap 240a; from here, the fraction of the load supported by the inner cap 240a is partially transmitted to the ground or the support surface, through the synthetic material mass 210, and partially transmitted, from the synthetic material mass 210, to the other inner cap 240b; finally, the load that weighs down on the latter is transmitted to the ground or the support surface, by the synthetic material mass 210. Thus, the outer cap actually supports only a first fraction of the total load, albeit significative, a significant second fraction of such load being supported by the reinforcement framework; the first and the second fractions of the load form altogether essentially the totality or however a prevalent portion of the total load which is offered to the support foot.

However, it is emphasized that further types of mechanical coupling between the stem and the outer cap 115 are possible, for example the outer cap 115 could comprise a recess for accommodating the end of the stem, instead of the hole 205, with a central hole for the insertion of the screw.

Moreover, in the exemplary embodiment shown, the transmission of the load from the stem 105 to the inner caps occurs not only by means of the outer cap 115 and the synthetic material mass 210, but also directly by the outer cap 115 in a non-negligible way, since, in correspondence of the hole 205, an edge strip of the inner cap 240a contacts the outer cap 115, and an edge strip of the inner cap 240b contacts in turn the inner cap 240a.

For the manufacturing of the base 110, the outer cap 115 and the inner caps 240a and 240b can be advantageously obtained by moulding with drawing and shearing machine starting from one sheet or sheets of a suitable material, for example metal, particularly steel.

Figure 4:
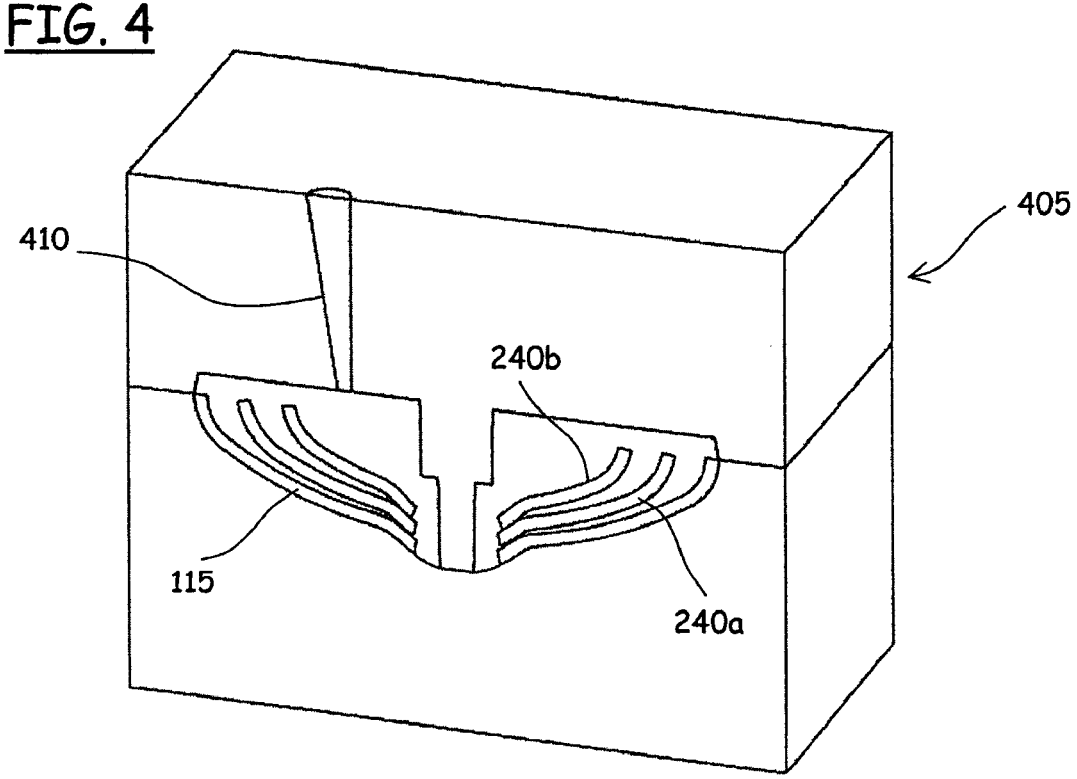
FIG. 4 shows, schematically and in axonometric view, a mould for overmoulding of synthetic material on the base, according to an embodiment of the present invention.

Then, the inner caps 240a and 240b are placed one within the other, and within of the outer cap 115, and they are all posed in a mould for injection moulding of synthetic material, schematically represented in FIG. 4 and denoted therein with 405. The mould is closed and synthetic material is made to flow therein, through a feed tube 410. In such a way, the synthetic material fills all the openings between the inner caps 240a and 240b and the outer cap 115, by substantially burying the inner caps 240a and 240b within the hardened synthetic material mass 210.

Thanks to the present invention, it is possible to produce a particularly strong base for support foot, adapted to support very heavy bodies, such as working machines. In particular, the improved strength of the support foot is obtained by the reinforcement frame 220, which constitutes a real reinforcement structure buried within the synthetic material mass 210.

The base for support foot according to the present invention guarantees an axial compression resistance higher than that obtainable without providing the reinforcement core, and which is comparable to that which is obtainable by using solutions much more expensive, such as the machine-tool manufacturing of solid steel bars or the forging, which would imply a great waste of material, great weight of the base and thus scarce handling, and like.

Thus is shown: A base (110) for a support foot (100) for supporting heavy bodies on a support surface, comprising: a cap (115) being made of a first material, a synthetic material mass (210) and a contact surface (215) said cap having a concavity on the side that faces the contact surface (215), the synthetic material mass (210) arranged in adhesion to the cap and adapted to substantially fill the concavity of the cap, having a reinforcement frame (240) made of a second material, integrated within said synthetic material mass. The method of manufacturing consists of the steps:

forming a cap (15) said cap being made of a first material, said cap having a concavity on the side that faces a contact surface (215), arranging a synthetic material mass (210) in adhesion to the cap, so as to substantially fill the concavity of the cap and integrating a support frame (240) within said synthetic material mass, said support frame being made of a second material.

The present invention has been herein described referring to an exemplary embodiment, however the persons skilled in the art may apply many modifications as well as find alternative embodiments, for example in order to satisfy specific requirements, without departing from the scope defined in the following claims.

For example, although in the present description reference has been made to a support foot with semi-stiff type base-stem coupling, nothing prevents from applying the invention for manufacturing support feet with articulated base-stem coupling.

Moreover, although the use of steel for manufacturing the outer cap and the reinforcement frame is preferable for guaranteeing the strength of the support foot for heavy loads, nothing prevents from using other materials, particularly but not exclusively other metals.

By varying the material from which the outer cap and the support frame are made, and thus their stiffness, it is possible to vary the corresponding percentage of total load which is supported by them.

Moreover, nothing prevents from making also the outer cap of a material of non particular value in term of superficial finishing, neither of particular resistance to the attack of the agents present in the environment where the base is intended to be used, by providing for example a cover (without any supporting function) for the outer cap which has the necessary requirements.

The invention claimed is:

1. A base for a support foot for supporting heavy bodies on a support surface, comprising: an outer cap being made of a first material, a synthetic material mass and a contact surface, said outer cap having a concavity on the side that faces the contact surface, wherein the contact surface rests on the support surface, the synthetic material mass arranged in adhesion to the outer cap and adapted to substantially fill the concavity of the outer cap; and a reinforcement frame made of a second material, integrated within said synthetic material mass, wherein said reinforcement frame comprises at least a further cap of reduced size compared to said outer cap and adapted to be accommodated within said concavity, wherein said at least a further cap comprises a first and a second further caps, wherein the first further cap has reduced size compared to the size of the outer cap, and the second further cap has reduced size compared to the size of the first further cap.

2. The base according to claim 1 further comprising coupling means, said coupling means being able to mechanically couple the outer cap to a body that is to be supported.

3. The base according to claim 1, said first material having mechanical properties such as to guarantee that the outer cap is able to support a first significant fraction of a load received by said coupling means from the body to be supported, said second material having mechanical properties comparable to those of the outer cap, such as to guarantee that the reinforcement frame can support a second significant fraction of said load, said first and second fractions of load forming altogether the substantial totality of the load.

4. The base according to claim 3, wherein said reinforcement frame is arranged so as to receive at least partially said second fraction of load by the outer cap directly or by said coupling means of the base with a body to be supported.

5. The base according to claim 1, wherein said synthetic material mass forms the contact surface with the support surface.

6. The base according to claim 1, wherein said first material comprises a metal or a metal alloy.

7. The base according to claim 6, wherein said first material comprises steel, particularly stainless steel or nickel-plated steel.

8. The base according to claim 1, wherein said synthetic material has a stiffness ranging from approximately 79 ShA and 100 ShA.

9. The base according to claim 1, wherein said synthetic material comprises nitrilic or polyurethane rubber.

10. The base according to claim 1, wherein said second material is a metal or a metal alloy.

11. The base according to claim 10, wherein said second material is steel.

12. The base according to claim 1, wherein said second material is iron.

* * * * *

UNITED STATES PATENT AND TRADEMARK OFFICE
CERTIFICATE OF CORRECTION

PATENT NO. : 7,784,753 B2 Page 1 of 1
APPLICATION NO. : 11/682388
DATED : August 31, 2010
INVENTOR(S) : Andreoli It is certified that error appears in the above-identified patent and that said Letters Patent is hereby corrected as shown below:

Column 5, line 43 "(15)" should be changed to -- (115) --

Signed and Sealed this

Seventh Day of December, 2010

David J. Kappos
*Director of the United States Patent and Trademark Office*